(12) United States Patent
Shimizu

(10) Patent No.: US 10,457,329 B2
(45) Date of Patent: Oct. 29, 2019

(54) VEHICLE FRONT PORTION STRUCTURE

(71) Applicant: TOYOTA JIDOSHA KABUSHIKI KAISHA, Toyota-shi (JP)

(72) Inventor: Satoshi Shimizu, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 59 days.

(21) Appl. No.: 15/846,801

(22) Filed: Dec. 19, 2017

(65) Prior Publication Data

US 2018/0178843 A1 Jun. 28, 2018

(30) Foreign Application Priority Data

Dec. 26, 2016 (JP) .................................. 2016-251938

(51) Int. Cl.
*B62D 21/02* (2006.01)
*B62D 25/08* (2006.01)
*B62D 27/02* (2006.01)

(52) U.S. Cl.
CPC ............. *B62D 21/02* (2013.01); *B62D 25/08* (2013.01); *B62D 27/02* (2013.01)

(58) Field of Classification Search
CPC .......... B62D 21/02; B62D 25/08; B62D 27/02
See application file for complete search history.

(56) References Cited

U.S. PATENT DOCUMENTS

| | | | | |
|---|---|---|---|---|
| 5,125,715 | A * | 6/1992 | Kijima | B62D 21/152 293/132 |
| 6,361,102 | B1 * | 3/2002 | Han | B62D 21/152 296/187.09 |
| 9,981,694 | B2 * | 5/2018 | Sekiguchi | B62D 25/08 |
| 10,183,700 | B2 * | 1/2019 | Hata | B62D 21/157 |
| 2017/0174064 | A1 * | 6/2017 | Shinoda | B60K 1/04 |
| 2018/0134318 | A1 * | 5/2018 | Hata | B62D 21/157 |
| 2019/0009820 | A1 * | 1/2019 | Kondo | B62D 21/152 |
| 2019/0009829 | A1 * | 1/2019 | Shirakami | B62D 25/08 |

FOREIGN PATENT DOCUMENTS

| | | |
|---|---|---|
| JP | 6-144297 A | 5/1994 |
| JP | 10-291419 | 11/1998 |
| JP | 2003-231483 | 8/2003 |
| JP | 2010-116004 A | 5/2010 |

\* cited by examiner

*Primary Examiner* — Faye M Fleming
(74) *Attorney, Agent, or Firm* — Oblon, McClelland, Maier & Neustadt, L.L.P.

(57) ABSTRACT

A vehicle front portion structure includes a front side member rear extending in a front-rear direction of a vehicle, a part of a front side of the front side member rear being an inclined portion inclined such that a position of the inclined portion rises toward a front side of the vehicle, and a tubular front side member fixed to the inclined portion of the front side member rear and extending from the inclined portion to the front side of the vehicle. A plate-shaped reinforcing member is fixed to an inner peripheral surface of the front side member, the reinforcing member is provided with an extending portion extending to a rear side of the vehicle behind a rear end of the front side member, and the extending portion is fixed to the front side member rear.

6 Claims, 3 Drawing Sheets

VEHICLE FRONT PORTION STRUCTURE

INCORPORATION BY REFERENCE

The disclosure of Japanese Patent Application No. 2016-251938 filed on Dec. 26, 2016 including the specification, drawings and abstract is incorporated herein by reference in its entirety.

BACKGROUND

1. Technical Field

The present disclosure relates to a vehicle front portion structure.

2. Description of Related Art

Japanese Unexamined Patent Application Publication No. 2003-231483 (JP 2003-231483 A) discloses a vehicle front portion structure that is provided with a front side member which extends in the front-rear direction of a vehicle as a whole. The front side member is provided with a rear portion extending in the front-rear direction of the vehicle, an inclined portion obliquely extending toward the upper front side of the vehicle from the front end of the rear portion, and a front portion extending forward from the front end of the inclined portion.

SUMMARY

The inclined portion of the front side member of the vehicle front portion structure disclosed in JP 2003-231483 A is disposed in the middle of the front-rear direction of the vehicle, and the front side member is shaped to be bent in both end portions of the inclined portion in the front-rear direction of the vehicle. Accordingly, once a load from the front side of the vehicle acts on the front side member of the vehicle front portion structure disclosed in JP 2003-231483 A, the front side member is bent in both end portions of the inclined portion in the front-rear direction of the vehicle and the load may not be efficiently transferred to the inclined portion and the rear portion from the front portion of the front side member. When the load cannot be appropriately transferred to the inclined portion and the rear portion of the front side member, the front portion of the front side member may undergo excessive deformation, which is not desirable.

An aspect relates to a vehicle front portion structure including a front side member rear extending in a front-rear direction of a vehicle, a part of a front side of the front side member rear being an inclined portion inclined such that a position of the inclined portion rises toward a front side of the vehicle, and a tubular front side member fixed to the inclined portion of the front side member rear and extending from the inclined portion to the front side of the vehicle. A plate-shaped reinforcing member is fixed to an inner peripheral surface of the front side member, the reinforcing member is provided with an extending portion extending to a rear side of the vehicle behind a rear end of the front side member, and the extending portion is fixed to the front side member rear.

According to the aspect, when a load from the front side of the vehicle acts on the front side member, the load is transferred to the front side member rear via the extending portion of the reinforcing member as well. Accordingly, the load from the front side of the vehicle can be transferred to the front side member rear more efficiently than in a case where the extending portion of the reinforcing member is not fixed to the front side member rear.

In the vehicle front portion structure according to the aspect, the vehicle front portion structure may further comprise a box-shaped torque box which is adjacent to the front side member in a width direction of the vehicle, and which is fixed to the front side member rear and the extending portion, the front side member rear, and the torque boxes may be fixed to one another at positions where wall portions of the extending portion, the front side member rear, and the torque boxes overlap one another.

According to the aspect, the load from the front side of the vehicle is dispersed and transferred to the torque boxes as well as the front side member rear via the extending portion of the reinforcing member. The extending portion of the reinforcing member, the front side member rear, and the torque boxes are fixed to one another at the positions where the extending portion of the reinforcing member, the front side member rear, and the torque boxes overlap one another, and thus the load from the extending portion of the reinforcing member can be directly transferred to the torque boxes. Accordingly, the load from the front side of the vehicle can be efficiently transferred to the torque boxes as well.

In the vehicle front portion structure according to the aspect, the front side member rear may be provided with a plate-shaped lower wall portion extending in the front-rear direction of the vehicle, a pair of side wall portions extending upward from edges of the lower wall portion on both sides in the width direction of the vehicle, and a pair of flange portions extending to both outer sides in the width direction of the vehicle from upper side edges of the side wall portions, the torque boxes may be provided with bottom wall portions, peripheral wall portions extending upward from peripheral edges of the bottom wall portions, and front wall portions extending to the front side of the vehicle from upper side edges of parts of the peripheral wall portions positioned on the front side of the vehicle, and the extending portion of the reinforcing member, the flange portions of the front side member rear, and the front wall portions of the torque boxes may be fixed to one another at positions where the extending portion of the reinforcing member, the flange portions of the front side member rear, and the front wall portions of the torque boxes overlap one another.

According to the aspect, a ridgeline extending in the width direction of the vehicle is formed at the boundary between the peripheral wall portion and the front wall portion of the torque box (In the present specification, "in the width direction of the vehicle" also means "substantially in the width direction of the vehicle"). The part of the torque box that is in the vicinity of the ridgeline is higher in strength and less likely to be deformed than the flat plate-shaped part where no ridgeline is formed. According to the aspect, the extending portion of the reinforcing member is fixed to an upper wall portion of the torque box. Accordingly, even when the load from the front side of the vehicle acts on the front wall portion of the torque box from the extending portion of the reinforcing member, the load is efficiently taken at the part of the torque box in the vicinity of the ridgeline that is behind the front wall portion. Accordingly, deformation of the box-shaped parts of the torque box such as the peripheral wall portion and the bottom wall portion can be appropriately suppressed.

In the vehicle front portion structure according to the aspect, the front side member may have a quadrangular tube shape and the front side member may be interposed between the side wall portions of the front side member rear and fixed by welding to the side wall portions.

In the vehicle front portion structure according to the aspect, an end portion of the extending portion of the reinforcing member on the rear side of the vehicle may extend to connect the side wall portions of the front side member rear to each other.

In the vehicle front portion structure according to the aspect, the front side member may have the quadrangular tube shape, the reinforcing member may be provided with a plate-shaped lower surface portion and a pair of side surface portions extending upward from edges of the lower surface portion on both sides in the width direction of the vehicle, and the side surface portions of the reinforcing member may be fixed to side surfaces of the inner peripheral surface of the front side member.

According to the aspect, the side surface portions of the reinforcing member are fixed to the side surfaces of the inner peripheral surface of the front side member, and thus collapse of the cross-sectional shape of the front side member during the action of the load on the front side member can be appropriately suppressed. Since the reinforcing member is provided with the extending portion as described above, the load can be appropriately transferred in the reinforcing member. In other words, according to the aspect, sectional collapse of the front side member can be appropriately suppressed and the load can be appropriately transferred to the front side member rear by the single reinforcing member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
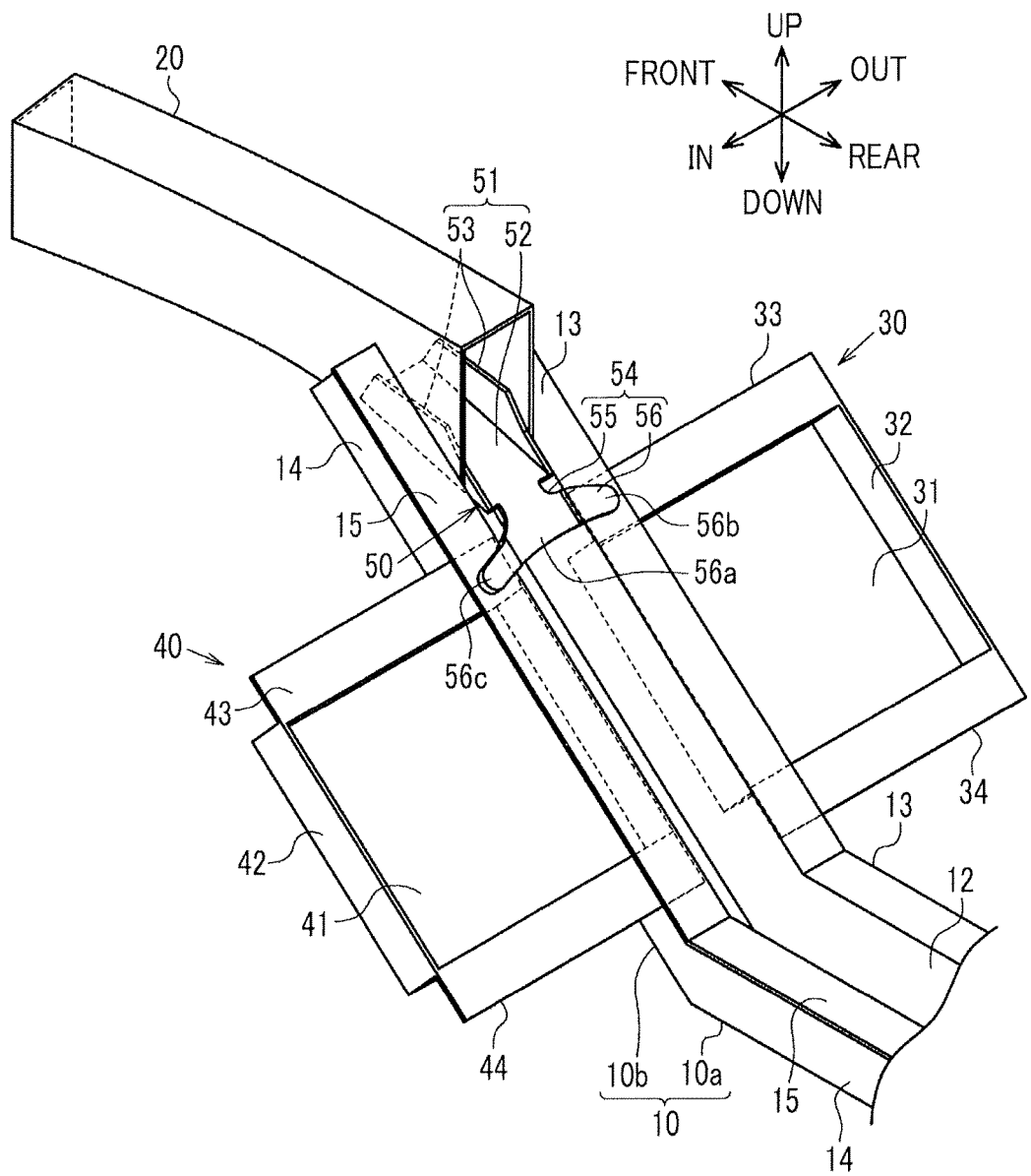
FIG. 1 is a perspective view of a vehicle front portion structure.
Figure 2:
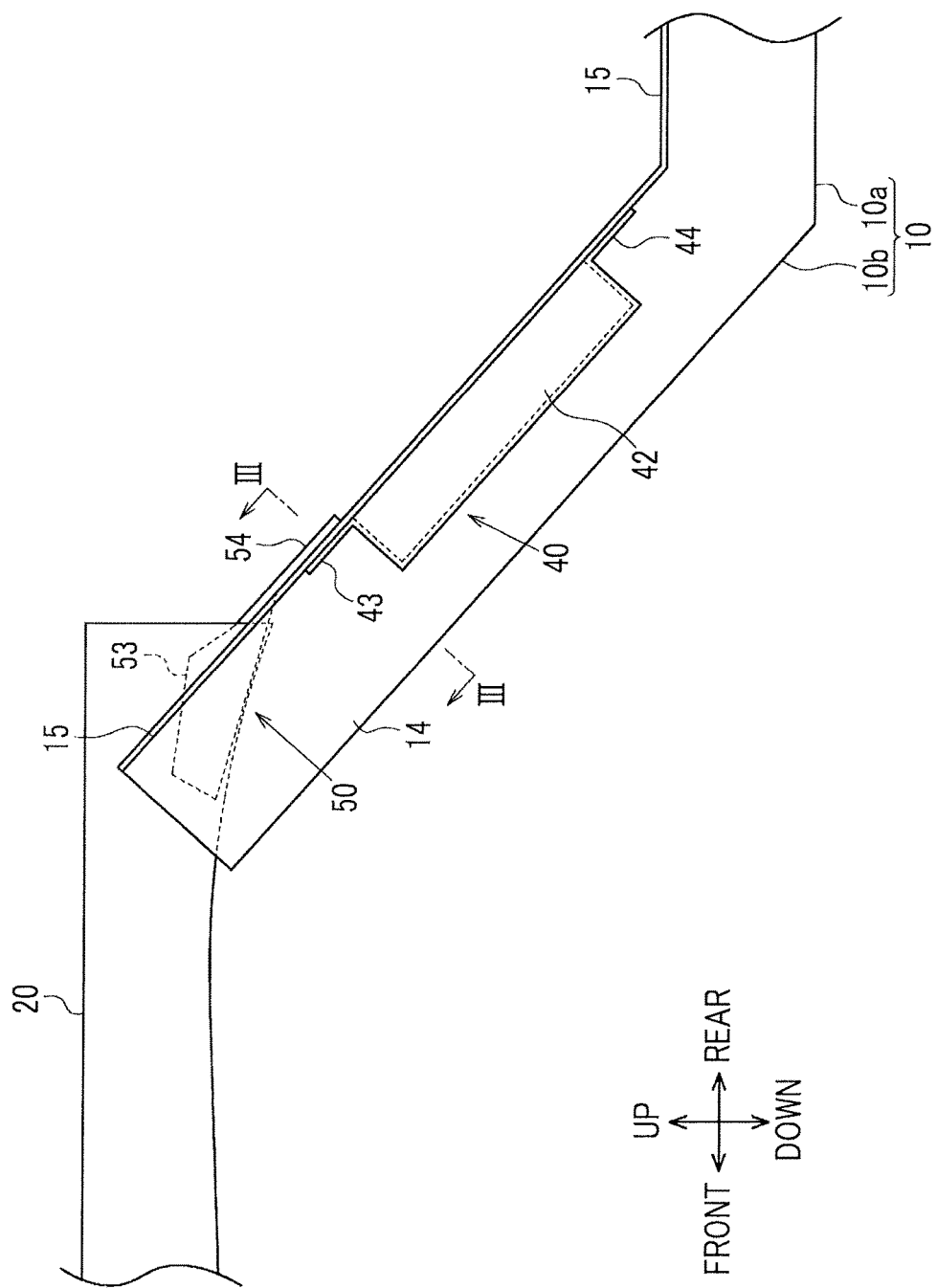
FIG. 2 is a side view of the vehicle front portion structure.

Hereinafter, an embodiment will be described with reference to FIGS. 1 to 4. In the following description, a vehicle front portion structure that is on the right side of a vehicle will be described as an example. As illustrated in FIGS. 1 and 2, a front side member rear 10 of the vehicle front portion structure (hereinafter, simply referred to as a member rear 10) extends in the front-rear direction of the vehicle as a whole. The member rear 10 is broadly divided into a linear portion 10a extending in the front-rear direction of the vehicle and an inclined portion 10b obliquely extending from the front end of the linear portion 10a to the upper front side of the vehicle. The rear end of the linear portion 10a of the member rear 10 is connected to the front end of a floor side member (not illustrated). A plate-shaped dash panel (not illustrated) and so on are disposed on the upper side of the inclined portion 10b.

Figure 3:
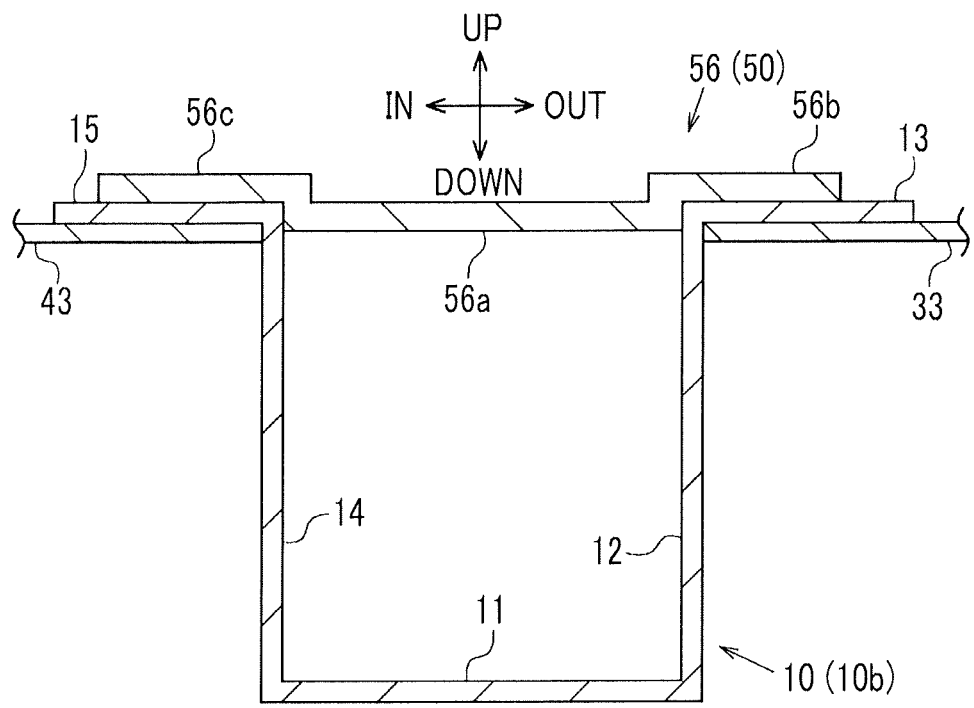
FIG. 3 is a sectional view taken along line III-III of FIG. 2.

As illustrated in FIG. 3, the member rear 10 has a hat-shaped cross section. Specifically, the member rear 10 is provided with a plate-shaped lower wall portion 11 that extends in the front-rear direction of the vehicle. As illustrated in FIG. 2, the lower wall portion 11 extends in the front-rear direction of the vehicle at the part that constitutes the linear portion 10a of the member rear 10. At the part that constitutes the inclined portion 10b of the member rear 10, the lower wall portion 11 is inclined such that its position rises toward the front side of the vehicle.

As illustrated in FIG. 3, an outer side wall portion 12 extends upward from the edge of the lower wall portion 11 that is on the outer side in the width direction of the vehicle. The outer side wall portion 12 is disposed over the entire region of the lower wall portion 11 in the front-rear direction of the vehicle. The length of extension of the outer side wall portion 12 from the lower wall portion 11 is constant in the front-rear direction of the vehicle. An outer side flange portion 13 extends toward the outer side in the width direction of the vehicle from the edge of the outer side wall portion 12 that is on its upper side. The outer side flange portion 13 is disposed over the entire region of the outer side wall portion 12 in the front-rear direction of the vehicle. The length of extension of the outer side flange portion 13 from the outer side wall portion 12 (dimension in the width direction of the vehicle) is constant in the front-rear direction of the vehicle.

As illustrated in FIG. 3, an inner side wall portion 14 extends upward from the edge of the lower wall portion 11 that is on the inner side in the width direction of the vehicle. The inner side wall portion 14 is disposed over the entire region of the lower wall portion 11 in the front-rear direction of the vehicle. The length of extension of the inner side wall portion 14 from the lower wall portion 11 is equal to the length of extension of the outer side wall portion 12 from the lower wall portion 11. An inner side flange portion 15 extends toward the inner side in the width direction of the vehicle (outer left side in the width direction of the vehicle with respect to the lower wall portion 11) from the edge of the inner side wall portion 14 that is on its upper side. The inner side flange portion 15 is disposed over the entire region of the inner side wall portion 14 in the front-rear direction of the vehicle. The length of extension of the inner side flange portion 15 from the inner side wall portion 14 (dimension in the width direction of the vehicle) is constant in the front-rear direction of the vehicle.

As illustrated in FIG. 1, a front side member 20 is fixed to the inclined portion 10b of the member rear 10. The front side member 20 has a quadrangular tube shape. The dimension of the front side member 20 from its outer surface on the outer side in the width direction of the vehicle to its outer surface on the inner side in the width direction of the vehicle is substantially equal to the dimension of the member rear 10 from the inner surface of the outer side wall portion 12 to the inner surface of the inner side wall portion 14. The front side member 20 has a rear side end portion that is fitted between the outer side wall portion 12 and the inner side wall portion 14 of the inclined portion 10b of the member rear 10. The wall portion of the front side member 20 that is on the outer side in the width direction of the vehicle and the outer side wall portion 12 of the inclined portion 10b of the member rear 10 are fixed to each other by welding. In addition, the outer surface of the front side member 20 that is on the inner side in the width direction of the vehicle and the inner side wall portion 14 of the inclined portion 10b of the member rear 10 are fixed to each other by welding. The front side member 20 is formed in the quadrangular tube shape by a plurality of plate-shaped panels bent in a predetermined shape being combined and fixed by welding. In the drawing, the front side member 20 is shown in a simplified manner in a simple quadrangular tube shape.

A quadrangular box-shaped outer torque box 30 is fixed to the outer side of the inclined portion 10b of the member rear 10 in the width direction of the vehicle. The outer torque box 30 has a quadrangular plate-shaped bottom wall portion 31. A peripheral wall portion 32 extends upward from the edges of the bottom wall portion 31 that are on both sides in the width direction of the vehicle, the front side, and the rear side. The peripheral wall portion 32 extends over the entire circumference of the peripheral edges (four sides) of the bottom wall portion 31. The surface that is on the inner side in the width direction of the vehicle as a part of the peripheral wall portion 32 that is positioned on the inner side in the width direction of the vehicle abuts against the outer side wall portion 12 of the inclined portion 10b of the member rear 10. The peripheral wall portion 32 of the outer torque box 30 and the outer side wall portion 12 of the inclined portion 10b of the member rear 10 are fixed by welding to each other at the abutment location.

A front wall portion 33 extends toward the front side of the vehicle from the upper edge of the part of the peripheral wall portion 32 of the outer torque box 30 that is positioned on the front side of the vehicle. The upper surface of the end portion of the front wall portion 33 that is on the inner side in the width direction of the vehicle abuts against the lower surface of the outer side flange portion 13 of the inclined portion 10b of the member rear 10. The front wall portion 33 of the outer torque box 30 and the outer side flange portion 13 of the inclined portion 10b of the member rear 10 are fixed by welding to each other at the abutment location.

A rear wall portion 34 extends toward the rear side of the vehicle from the upper edge of the part of the peripheral wall portion 32 of the outer torque box 30 that is positioned on the rear side of the vehicle. The upper surface of the end portion of the rear wall portion 34 that is on the inner side in the width direction of the vehicle abuts against the lower surface of the outer side flange portion 13 of the inclined portion 10b of the member rear 10. The rear wall portion 34 of the outer torque box 30 and the outer side flange portion 13 of the inclined portion 10b of the member rear 10 are fixed by welding to each other at the abutment location.

A quadrangular box-shaped inner torque box 40 is fixed to the inner side of the inclined portion 10b of the member rear 10 in the width direction of the vehicle. The inner torque box 40 has a quadrangular plate-shaped bottom wall portion 41. A peripheral wall portion 42 extends upward from the edges of the bottom wall portion 41 that are on both sides in the width direction of the vehicle, the front side, and the rear side. The peripheral wall portion 42 extends over the entire circumference of the peripheral edges (four sides) of the bottom wall portion 41. The surface that is on the outer side in the width direction of the vehicle as a part of the peripheral wall portion 42 that is positioned on the outer side in the width direction of the vehicle abuts against the inner side wall portion 14 of the inclined portion 10b of the member rear 10. The peripheral wall portion 42 of the inner torque box 40 and the inner side wall portion 14 of the inclined portion 10b of the member rear 10 are fixed by welding to each other at the abutment location.

A front wall portion 43 extends toward the front side of the vehicle from the upper edge of the part of the peripheral wall portion 42 of the inner torque box 40 that is positioned on the front side of the vehicle. The upper surface of the end portion of the front wall portion 43 that is on the outer side in the width direction of the vehicle abuts against the lower surface of the inner side flange portion 15 of the inclined portion 10b of the member rear 10. The front wall portion 43 of the inner torque box 40 and the inner side flange portion 15 of the inclined portion 10b of the member rear 10 are fixed by welding to each other at the abutment location.

A rear wall portion 44 extends toward the rear side of the vehicle from the upper edge of the part of the peripheral wall portion 42 of the inner torque box 40 that is positioned on the rear side of the vehicle. The upper surface of the end portion of the rear wall portion 44 that is on the outer side in the width direction of the vehicle abuts against the lower surface of the inner side flange portion 15 of the inclined portion 10b of the member rear 10. The rear wall portion 44 of the inner torque box 40 and the inner side flange portion 15 of the inclined portion 10b of the member rear 10 are fixed by welding to each other at the abutment location.

Figure 4:
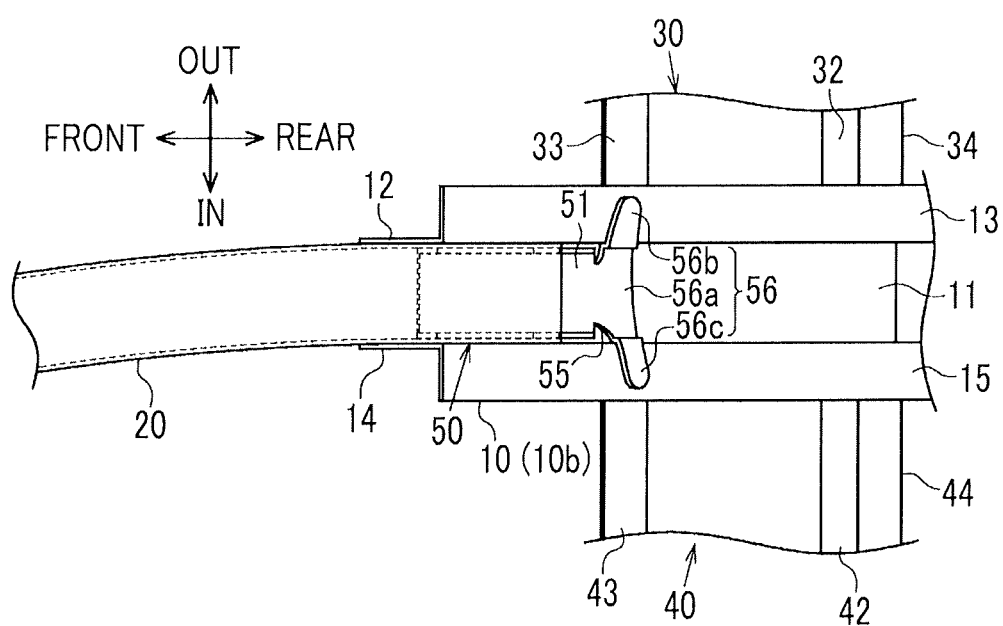
FIG. 4 is a top view of the vehicle front portion structure.

As illustrated in FIG. 1, a plate-shaped reinforcing member 50 is fixed to the inner peripheral surface of the front side member 20. A body portion 51 of the reinforcing member 50 is provided with a rectangular plate-shaped lower surface portion 52. The dimension of the lower surface portion 52 in the width direction of the vehicle is substantially equal to the dimension of the inner peripheral surface of the front side member 20 in the width direction of the vehicle. A pair of side surface portions 53 extends upward from the edges of the lower surface portion 52 that are on both sides in the width direction of the vehicle. Each of the side surface portions 53 extends substantially at a right angle to the lower surface portion 52. The lower surface portion 52 of the reinforcing member 50 is fixed by welding to the lower surface of the inner peripheral surface of the front side member 20. In addition, each of the side surface portions 53 of the reinforcing member is fixed by welding to the respective side surfaces of the inner peripheral surface of the front side member 20. As illustrated in FIG. 4, the rear end edge of the body portion 51 is positioned behind the rear end edge of the front side member 20 (open edge on the rear side).

As illustrated in FIG. 1, the reinforcing member 50 is provided with an extending portion 54 that extends to the rear side from the rear end edge of the body portion 51. The rear end edge of the body portion 51 is positioned behind the rear end edge of the front side member 20 as described above, and thus the extending portion 54 that extends to the rear side from the rear end edge of the body portion 51 also extends to the rear side behind the rear end edge of the front side member 20. The extending portion 54 is bent with respect to the body portion 51 and is inclined such that its position falls toward the rear side.

The extending portion 54 is provided with a base end portion 55 and a tip portion 56. The base end portion 55 is the part of the extending portion 54 that is on the body portion 51 side. The tip portion 56 is the part of the extending portion 54 that is on the rear side of the base end portion 55. The dimension of the base end portion 55 of the extending portion 54 in the width direction of the vehicle is shorter than the dimension of the body portion 51 in the width direction of the vehicle and the base end portion 55 is narrower than the body portion 51. The tip portion 56 of the extending portion 54 is longer in dimension in the width direction of the vehicle than the base end portion 55. In the present embodiment, the dimension of the tip portion 56 in the width direction of the vehicle is longer than the distance between the outer side wall portion 12 and the inner side wall portion 14 of the member rear 10.

As illustrated in FIG. 3, a middle portion 56a of the tip portion 56 in the width direction of the vehicle protrudes downward. The dimension of the middle portion 56a in the width direction of the vehicle is substantially equal to the distance between the outer side wall portion 12 and the inner side wall portion 14 of the member rear 10. The middle portion 56a is fitted between the outer side wall portion 12 and the inner side wall portion 14.

An outer side end portion 56b is on the outer side of the middle portion 56a of the tip portion 56 in the width direction of the vehicle. The outer side end portion 56b overlaps the upper surface of the outer side flange portion 13 of the member rear 10. In the present embodiment, the outer side end portion 56b overlaps the part where the front wall portion 33 of the outer torque box 30 and the outer side flange portion 13 of the member rear 10 overlap each other. In other words, the outer side end portion 56b of the extending portion 54 of the reinforcing member 50, the outer side flange portion 13 of the member rear 10, and the front wall portion 33 of the outer torque box 30 overlap one another. The three portions are fixed by welding to one another at the position where the three portions overlap one another.

An inner side end portion 56c is on the inner side of the middle portion 56a of the tip portion 56 in the width direction of the vehicle. The inner side end portion 56c overlaps the upper surface of the inner side flange portion 15 of the member rear 10. In the present embodiment, the inner side end portion 56c overlaps the part where the front wall portion 43 of the inner torque box 40 and the inner side flange portion 15 of the member rear 10 overlap each other. In other words, the inner side end portion 56c of the extending portion 54 of the reinforcing member 50, the inner side flange portion 15 of the member rear 10, and the front wall portion 43 of the inner torque box 40 overlap one another. The three portions are fixed by welding to one another at the position where the three portions overlap one another.

Hereinafter, the actions and effects of the present embodiment will be described. Assuming a case where the reinforcing member 50 is not fixed to the inner peripheral surface of the front side member 20 in the present embodiment, a load acting on the front side member 20 from the front side of the vehicle results in the load acting in a concentrated manner on the location where the front side member 20 and the inclined portion 10b of the member rear 10 are welded to each other. Then, rupture may occur at the welding point between the front side member 20 and the inclined portion 10b of the member rear 10. In addition, the directions of extension of the front side member 20 and the inclined portion 10b of the member rear 10 intersect with each other, and thus the front side member 20 and the inclined portion 10b of the member rear 10 are shaped to be bent when they are seen as a whole. Accordingly, once the load acts on the front side member 20 from the front side of the vehicle, bending deformation may arise from the location where the front side member 20 and the inclined portion 10b of the member rear 10 are fixed to each other (bending location) as a reference point. Once the situation occurs, the load acting on the front side member 20 may not be transferred to the member rear 10 and the front side member 20 may undergo excessive deformation or the like.

In the present embodiment, the extending portion 54 of the reinforcing member 50 extends to the rear side behind the rear end of the front side member 20 and the extending portion 54 is fixed to the member rear 10 in this regard. Accordingly, when the load from the front side of the vehicle acts on the front side member 20, the load is transferred to the member rear 10 via the extending portion 54 of the reinforcing member 50. Accordingly, the load from the front side of the vehicle can be transferred to the member rear 10 more efficiently than in a case where the reinforcing member 50 is not disposed as in the example described above. In addition, the side surface portions 53 of the reinforcing member 50 are fixed to the respective side surfaces of the inner peripheral surface of the front side member 20. Accordingly, sectional collapse of the front side member 20 can be appropriately suppressed and the load can be appropriately transferred to the member rear 10 with the single reinforcing member 50.

In the present embodiment, the outer side end portion 56b of the extending portion 54 of the reinforcing member 50, the outer side flange portion 13 of the member rear 10, and the front wall portion 33 of the outer torque box 30 are fixed by welding to one another at the position where the three portions overlap one another. Accordingly, the load from the front side of the vehicle is transferred to the outer torque box 30 as well as the member rear 10 via the extending portion 54 of the reinforcing member 50. In addition, since the outer side end portion 56b of the extending portion 54 of the reinforcing member 50 is fixed by welding at the position where the three portions overlap one another as described above, the load from the extending portion 54 of the reinforcing member 50 can be directly transferred to the outer torque box 30 without having to be transferred via, for example, the lower wall portion 11 and the outer side wall portion 12 of the member rear 10. Accordingly, the load from the front side of the vehicle can be efficiently transferred to the outer torque box 30.

The load from the extending portion 54 of the reinforcing member 50 is considered to be transferred first to the front wall portion 33 of the outer torque box 30, then to the peripheral wall portion 32, and then to the bottom wall portion 31. The bottom wall portion 31 of the outer torque box 30, in particular, has a flat plate shape and its middle portion is likely to be curved, and thus the bottom wall portion 31 may undergo unexpected deformation once an excessive load acts on the bottom wall portion 31. In the present embodiment, a ridgeline extending substantially in the width direction of the vehicle is formed at the boundary between the peripheral wall portion 32 and the front wall portion 33 of the outer torque box 30 in this regard. The part of the outer torque box 30 that is in the vicinity of the ridgeline is higher in strength and less likely to be deformed than the middle portion of the bottom wall portion 31 that has, for example, a flat plate shape. Accordingly, even when the load from the front side of the vehicle acts on the front wall portion 33 of the outer torque box 30 from the extending portion 54 of the reinforcing member 50, the load is efficiently taken at the part in the vicinity of the ridgeline that is behind the front wall portion 33. Accordingly, deformation of the box-shaped parts of the outer torque box 30 such as the peripheral wall portion 32 and the bottom wall portion 31 can be appropriately suppressed.

The actions and effects related to load transfer from the extending portion 54 of the reinforcing member 50 to the outer torque box 30 are the same as those related to load transfer from the extending portion 54 of the reinforcing member 50 to the inner torque box 40.

In the present embodiment, the middle portion 56a of the tip portion 56 of the extending portion 54 protrudes downward. Accordingly, when the extending portion 54 of the reinforcing member 50 is fixed to the member rear 10, positioning of the reinforcing member 50 in the width direction of the vehicle with respect to the member rear 10 can be performed with ease by the middle portion 56a of the tip portion 56 being fitted between the outer side wall portion 12 and the inner side wall portion 14 of the member rear 10. In a state where the extending portion 54 of the reinforcing member 50 is fixed to the member rear 10, the middle portion 56a of the tip portion 56 of the extending portion 54 extends to connect the outer side wall portion 12 and the inner side wall portion 14 of the member rear 10 to each other. Accordingly, the middle portion 56a of the tip portion 56 of the extending portion 54 functions as a beam and a reinforcing effect for the inclined portion 10b of the member rear 10 can also be anticipated.

The above-described effects are realized by the reinforcing member 50 for reinforcing the front side member 20. Accordingly, an increase in the number of components and an increase in the complexity of assembly processes can be minimized compared to a case where a member other than the member for reinforcing the front side member 20 is disposed for load transfer from the front side of the vehicle.

The present embodiment can be modified as follows.

The outer side end portion 56b of the reinforcing member 50 may not necessarily overlap and be fixed to the outer side flange portion 13 of the member rear 10 and the front wall portion 33 of the outer torque box 30. For example, the outer side end portion 56b of the reinforcing member 50 may be fixed to the part of the outer side flange portion 13 of the member rear 10 where the front wall portion 33 and the rear wall portion 34 of the outer torque box 30 do not overlap each other.

The outer side end portion 56b of the reinforcing member 50 may not be fixed to the outer side flange portion 13 of the member rear 10. For example, the outer side end portion 56b may be fixed to the outer side wall portion 12 or the lower wall portion 11 of the member rear 10. In a case where the outer side end portion 56b of the reinforcing member 50 is fixed to the outer side wall portion 12 of the member rear 10, the outer side end portion 56b of the reinforcing member 50, the outer side wall portion 12 of the member rear 10, and the peripheral wall portion 32 of the outer torque box 30 may be fixed to one another at the position where the three portions overlap one another.

Although the front wall portion 33 of the outer torque box 30 is positioned on the lower side of the outer side flange portion 13 of the member rear 10 and the outer side end portion 56b of the reinforcing member 50 is positioned on the upper side of the outer side flange portion 13 of the member rear 10 in the present embodiment, the order in which the three portions overlap one another can be appropriately changed. For example, the outer side end portion 56b of the reinforcing member 50 may be positioned on the upper side of the outer side flange portion 13 of the member rear 10 and the front wall portion 33 of the outer torque box 30 may be positioned on the upper side of the outer side end portion 56b. The order may be appropriately changed in view of the shape of the outer torque box 30, the shape of the member rear 10, the shapes of the other peripheral members, and so on.

The method by which the outer side end portion 56b of the reinforcing member 50 is fixed to the outer side flange portion 13 of the member rear 10 is not limited to welding. For example, the outer side end portion 56b of the reinforcing member 50 may be fixed to the outer side flange portion 13 of the member rear 10 with a bolt and a nut. An adhesive may be used instead insofar as the adhesive ensures the needed strength.

The above-described modification examples related to the outer side end portion 56b of the reinforcing member 50, the outer side flange portion 13 of the member rear 10, and the front wall portion 33 of the outer torque box 30 can be similarly applied to the inner side end portion 56c of the reinforcing member 50, the inner side flange portion 15 of the member rear 10, and the front wall portion 43 of the inner torque box 40, respectively.

The shape of the outer torque box 30 and the inner torque box 40 can be appropriately changed insofar as the shape is a box shape as a whole and the load from the member rear 10 or the like can be taken. For example, the front wall portion 33 and the rear wall portion 34 may be omitted from the outer torque box 30. In addition, for example, another wall portion may extend from the front edge of the front wall portion 33 of the outer torque box 30 or a wall portion other than the front wall portion 33 and the rear wall portion 34 may extend from the peripheral wall portion 32. In other words, the shape may be appropriately changed in view of the peripheral members of the outer torque box 30 and the inner torque box 40, a method for fixing the peripheral members, and so on.

The locations where the outer torque box 30 and the inner torque box 40 are fixed to the member rear 10 can also be appropriately changed. For example, a wall portion extending toward the inner side in the width direction of the vehicle from the bottom wall portion 31 and the peripheral wall portion 32 of the outer torque box 30 may be fixed to the lower surface of the lower wall portion 11 of the member rear 10.

The member rear 10 may not necessarily be shaped to have the hat-shaped cross section. For example, a wall portion that has an arc-shaped cross section with its middle portion in the width direction of the vehicle protruding downward may be adopted instead of the lower wall portion 11, the outer side wall portion 12, and the inner side wall portion 14.

The shape of the front side member 20 is not limited to the quadrangular tube shape insofar as the shape is a tubular shape and the reinforcing member 50 can be fixed inside. For example, the shape may be the shape of a triangular tube, the shape of a polygonal tube that has at least five corners, or the shape of a cylinder.

The base end portion 55 of the reinforcing member 50 may not be narrower than the body portion 51. When the extending portion 54 is bent with respect to the body portion 51 during the manufacturing of the reinforcing member 50, the bending processing can be more easily performed with the base end portion 55 being narrower. Meanwhile, the base end portion 55 not being narrower is more desirable from the viewpoint of appropriately suppressing the deformation of the reinforcing member 50 arising from the base end portion 55 as the reference point. The shape of the base end portion 55 (presence or absence of the narrowness or the like) may be appropriately designed in view of the ease of processing of the reinforcing member 50, the magnitude of the load that is likely to act on the reinforcing member 50, and so on.

The body portion 51 of the reinforcing member 50 may be of any shape. The strength of the front side member 20 can be further improved when the plate-shaped reinforcing member 50 is fixed to the inner peripheral surface of the front side member 20.

What is claimed is:

1. A vehicle front portion structure comprising:
a front side member rear extending in a front-rear direction of a vehicle, a part of a front side of the front side member rear being an inclined portion inclined such that a position of the inclined portion rises toward a front side of the vehicle:

a tubular front side member fixed to the inclined portion of the front side member rear and extending from the inclined portion to the front side of the vehicle; and a reinforcing member being fixed to an inner peripheral surface of the front side member, the reinforcing member having a plate shape, wherein the reinforcing member is provided with an extending portion extending to a rear side of the vehicle behind a rear end of the front side member; and the extending portion is fixed to the front side member rear.

2. The vehicle front portion structure according to claim 1, further comprising:

a box-shaped torque box being adjacent to the front side member rear in a width direction of the vehicle, the box-shaped torque box being fixed to the front side member rear, wherein the extending portion, the front side member rear, and the torque boxes are fixed to one another at positions where wall portions of the extending portion, the front side member rear, and the torque boxes overlap one another.

3. The vehicle front portion structure according to claim 2, wherein:

the front side member rear is provided with a plate-shaped lower wall portion extending in the front-rear direction of the vehicle, a pair of side wall portions extending upward from edges of the lower wall portion on both sides in the width direction of the vehicle, and a pair of flange portions extending to both outer sides in the width direction of the vehicle from upper side edges of the side wall portions;

the torque boxes are provided with bottom wall portions, peripheral wall portions extending upward from peripheral edges of the bottom wall portions, and front wall portions extending to the front side of the vehicle from upper side edges of parts of the peripheral wall portions positioned on the front side of the vehicle; and the extending portion of the reinforcing member, the flange portions of the front side member rear, and the front wall portions of the torque boxes are fixed to one another at positions where the extending portion of the reinforcing member, the flange portions of the front side member rear, and the front wall portions of the torque boxes overlap one another.

4. The vehicle front portion structure according to claim 3, wherein:

the front side member has a quadrangular tube shape; and the front side member is interposed between the side wall portions of the front side member rear and is fixed by welding to the side wall portions.

5. The vehicle front portion structure according to claim 3, wherein an end portion of the extending portion of the reinforcing member on the rear side of the vehicle extends to connect the side wall portions of the front side member rear to each other.

6. The vehicle front portion structure according to claim 1, wherein:

the front side member has a quadrangular tube shape;

the reinforcing member is provided with a plate-shaped lower surface portion and a pair of side surface portions extending upward from edges of the lower surface portion on both sides in a width direction of the vehicle; and the side surface portions of the reinforcing member are fixed to side surfaces of the inner peripheral surface of the front side member.

\* \* \* \* \*